(12) United States Patent
Debien

(10) Patent No.: US 7,757,637 B1
(45) Date of Patent: Jul. 20, 2010

(54) LITTER BOX LIFTING DEVICE

(76) Inventor: Fred Debien, 14250 Lark Ct., Clearwater, FL (US) 33716

( * ) Notice: Subject to any disclaimer, the term of this patent is extended or adjusted under 35 U.S.C. 154(b) by 183 days.

(21) Appl. No.: 12/169,686

(22) Filed: Jul. 9, 2008

(51) Int. Cl.
*A01K 29/00* (2006.01)
(52) U.S. Cl. .................................................. 119/165
(58) Field of Classification Search ............. 119/161, 119/163, 165, 166, 168; D30/161; 209/374, 209/373, 233, 417
See application file for complete search history.

(56) References Cited

U.S. PATENT DOCUMENTS

| 3,482,546 | A | | 12/1969 | Anderson |
| 3,735,735 | A | * | 5/1973 | Noroian ........................ 119/165 |
| 4,299,190 | A | * | 11/1981 | Rhodes ......................... 119/170 |
| 4,327,667 | A | * | 5/1982 | Bilak ............................ 119/166 |
| 4,522,150 | A | | 6/1985 | Gershman |
| 4,886,014 | A | | 12/1989 | Sheriff |
| 4,934,317 | A | * | 6/1990 | Pourshalchi ................. 119/165 |
| 5,178,099 | A | | 1/1993 | Lapps et al. |
| 5,507,252 | A | | 4/1996 | Ebert |
| 5,673,648 | A | | 10/1997 | Ayle |
| 5,823,137 | A | | 10/1998 | Rood et al. |
| 6,095,088 | A | * | 8/2000 | Savicki ........................ 119/166 |
| 6,401,660 | B1 | | 6/2002 | Wolff |
| 7,013,835 | B2 | | 3/2006 | Brokaski |
| 7,293,528 | B2 | * | 11/2007 | Fairhall ....................... 119/166 |

* cited by examiner

*Primary Examiner*—Thomas Price
(74) *Attorney, Agent, or Firm*—Thomas Frost

(57) ABSTRACT

A litter box housing for cats having a litter box inside the housing positioned upon a tray. The tray is engaged with a cam arms which are connected to an upper lid of the housing, and the tray rests on a base of the housing when the lid is closed. When the lid is opened, the cam arms lift the tray with the litter box, and lock the tray in an elevated position. The litter box can either be cleaned for waste materials or disposed of in its entirety.

4 Claims, 6 Drawing Sheets

LITTER BOX LIFTING DEVICE

BACKGROUND OF INVENTION

The present invention relates to housing for cats having a litter box inside the housing positioned upon a tray. The tray is engaged with cam arms which are connected to a lid of the housing, and the tray rests on a base of the housing when the lid is closed. When the lid is released from a closed position, gas springs lift the lid, and lock the tray in an elevated position. The litter box can either be cleaned of waste materials or disposed of in its entirety.

As cat owners age, disposal of waste material in a litter box for cats becomes more physically demanding because of the bending and lifting involved. While there are other box-like structures which contain reservoirs of litter material for use by cats for elimination, easy disposal of the material remains a problem. Most of the structures rely upon sifting devices and chutes, or rotating the structure in its entirety to separate the waste.

It is an object of the invention to provide a box-like structure for ingress and egress by cats to use a conventional litter box positioned upon a tray, wherein the tray can be elevated for easy disposal of the box or cleaning of the waste material in the box and refilling with litter.

SUMMARY OF THE INVENTION

The general purpose of the present invention, which will be described subsequently in greater detail, is to provide a new and improved litter box lifting device.

To attain this, the present invention comprises a generally rectangular housing having a base portion, side walls, rear wall and front wall, the walls being interconnected. The walls are preferably connected by a series of prongs inserted into complimentary apertures. There is an opening to permit ingress and egress of an animal.

A lid is pivotally attached to the housing near the rear wall. Pair of cam arms has a first end and a second end, wherein the first ends are configured to attach to the inner surface of the lid at opposing sides of the lid. The cam arms each have elongated slots integrally formed therein, and are arcuately shaped at the second end. A tray, structured for holding a standard litter box and having side walls, is attached with the cam arms with roller means positioned through the elongated slot of each cam arm. In an embodiment of the invention, gas springs are mounted on the side walls. A holding member is pivotally attached to the front wall. A latch is rotatably engaged to the holding member. The holding member compresses the gas springs and also maintains the lid in a closed position.

To operate the present invention a litter box is placed on the tray. The litter box has absorbent litter material therein. The animal can enter the housing and use the litter box. When the litter box needs to be disposed of or waste material cleaned, the latch is rotated, the holding member is release from a closed position and the lid is released. The gas springs propel the lid upwardly. The cam arms attached to the tray move through their rotation with the roller means moving along the elongated slot of each cam arm. Once the roller means reached a predetermined position along the slot the tray is stabilized into an elevated position. The litter box can then be replaced or the litter material cleaned. It should be recognized that in an embodiment of the invention without the gas springs the lid can be manually lifted by the users.

To put the tray and litter box into the housing for further use, the lid is pushed downward to a closed position and secured by the locking member.

BRIEF DESCIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
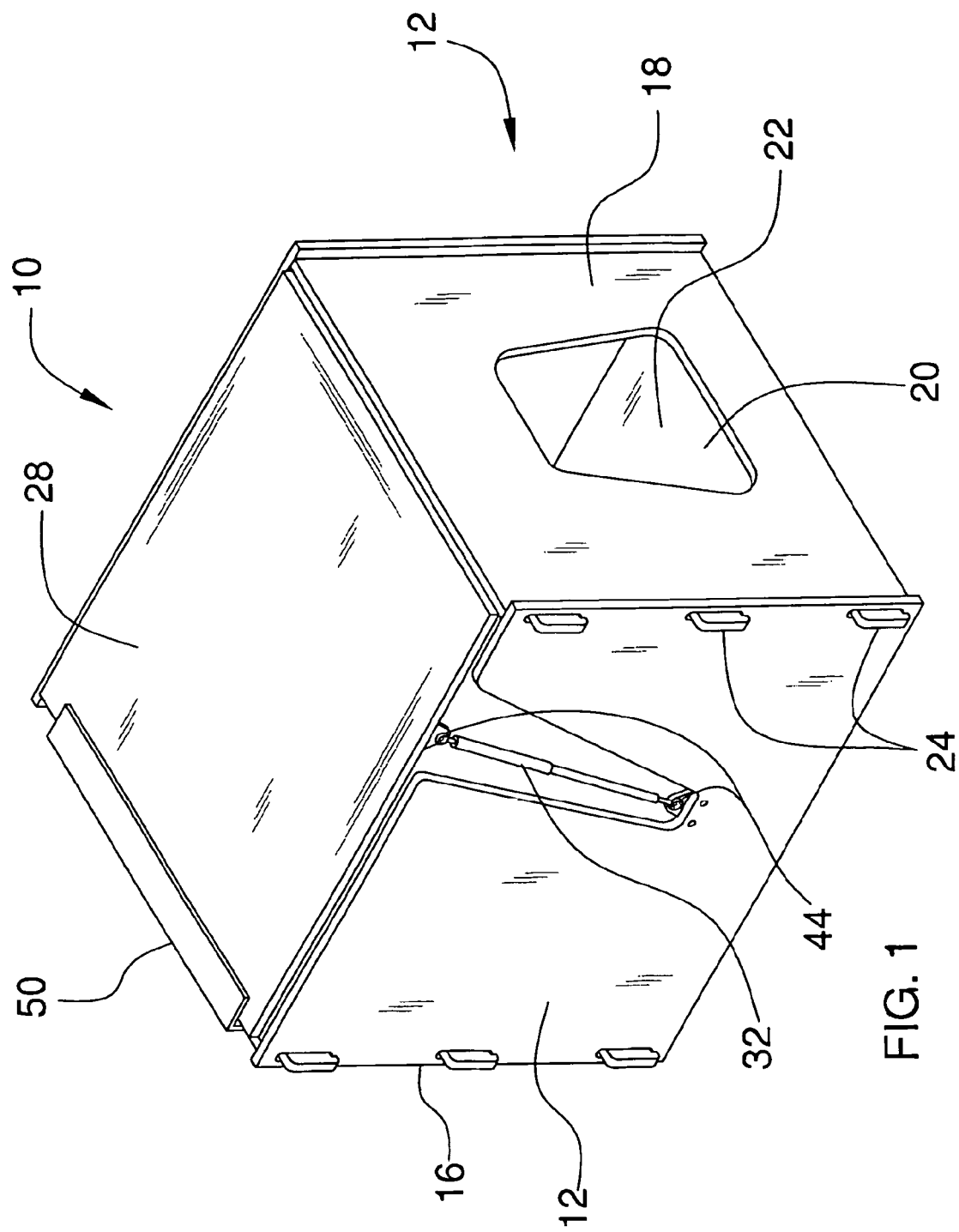
FIG. 1 is a rear perspective view of the preferred embodiment of the present invention.
Figure 2:
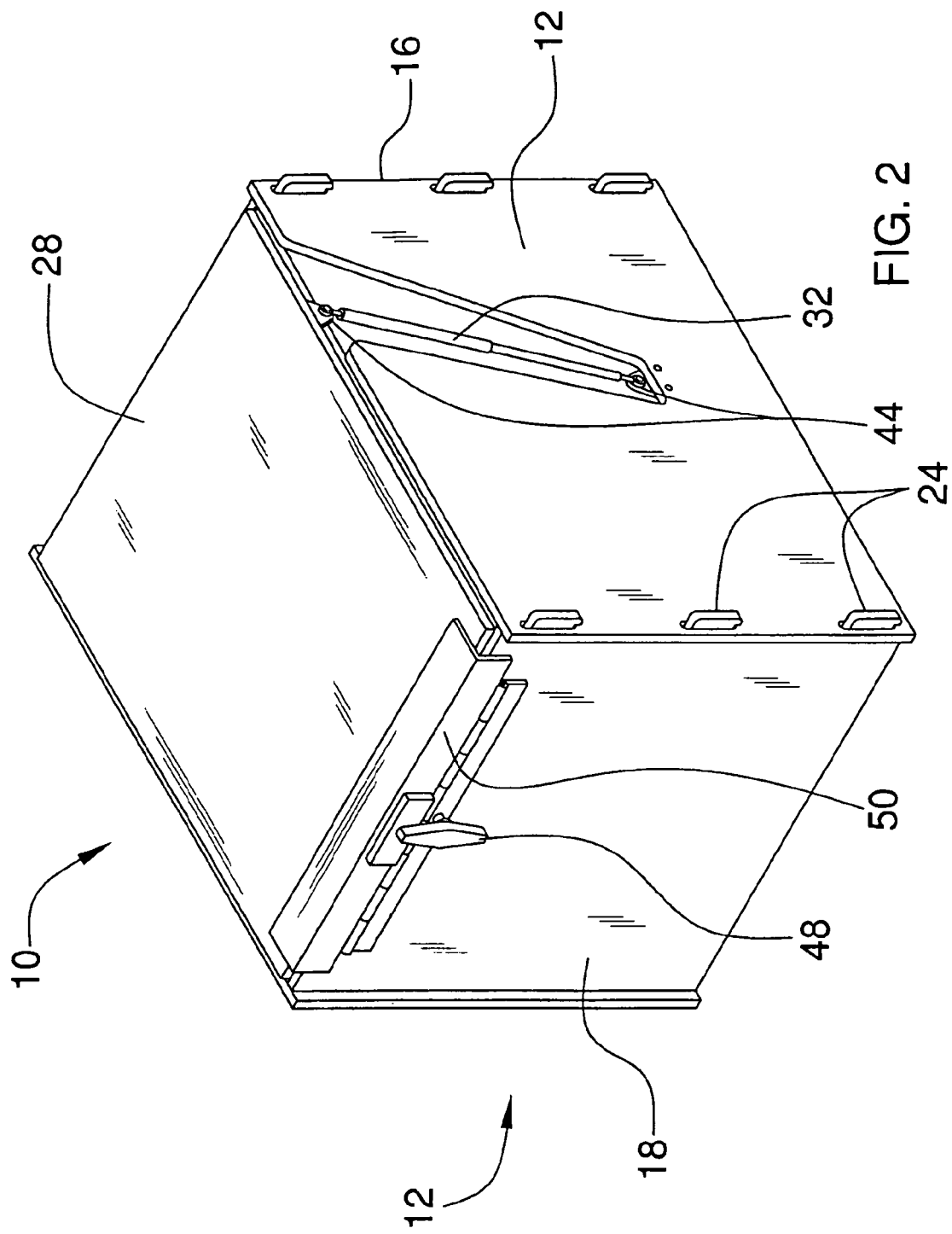
FIG. 2 is a front perspective view of the preferred embodiment of the present invention.

Referring first to FIGS. 1 and 2, therein is shown a perspective view of a litter box lifting device, generally designated 10, according to the present invention. As illustrated, the device 10 includes a generally rectangular housing 12 having a pair of planer side walls 14, a planer rear wall 16 and a planer front wall 18. The planer rear wall 16 has an opening 20 to permit ingress and egress of a cat. The side walls 14, rear wall 16 and front wall 18 are connected to a planer base 22 at first ends, and extend substantially vertical at a right angle from the base 22 to second ends. The position of the rear wall 14 and front wall 18 can be reversed during assembly to allow the opening 20 to be repositioned. Of course, while the housing 12 has been described as rectangular it is not limited to such shape, and it is intended to include additional shapes. A lid 28 having an inner and outer surface is pivotally mounted to the housing 12 by hinge means 30.

In the preferred embodiment of the device 10, a pair of gas springs 32, each having a first end and a second end, are connected at the first end to a bracket 44 mounted to the inner surface of the lid 28 and connected at the second end to a bracket 44 mounted on the side walls 14. As illustrated in the preferred embodiment of the device 10 the side walls 14 have a parabolically shaped space defined therein to facilitate the mounting of the gas springs 32.

When gas springs 32 are mounted on the side walls a holding member 50 is pivotally attached juxtaposed to the second end of the front wall 18. A latch 48 is rotatably connected to the locking member 50. The holding member 50 locks the lid 28 in a closed position. When the lid 28 is in the closed position the gas springs 32 are compressed.

Figure 3:
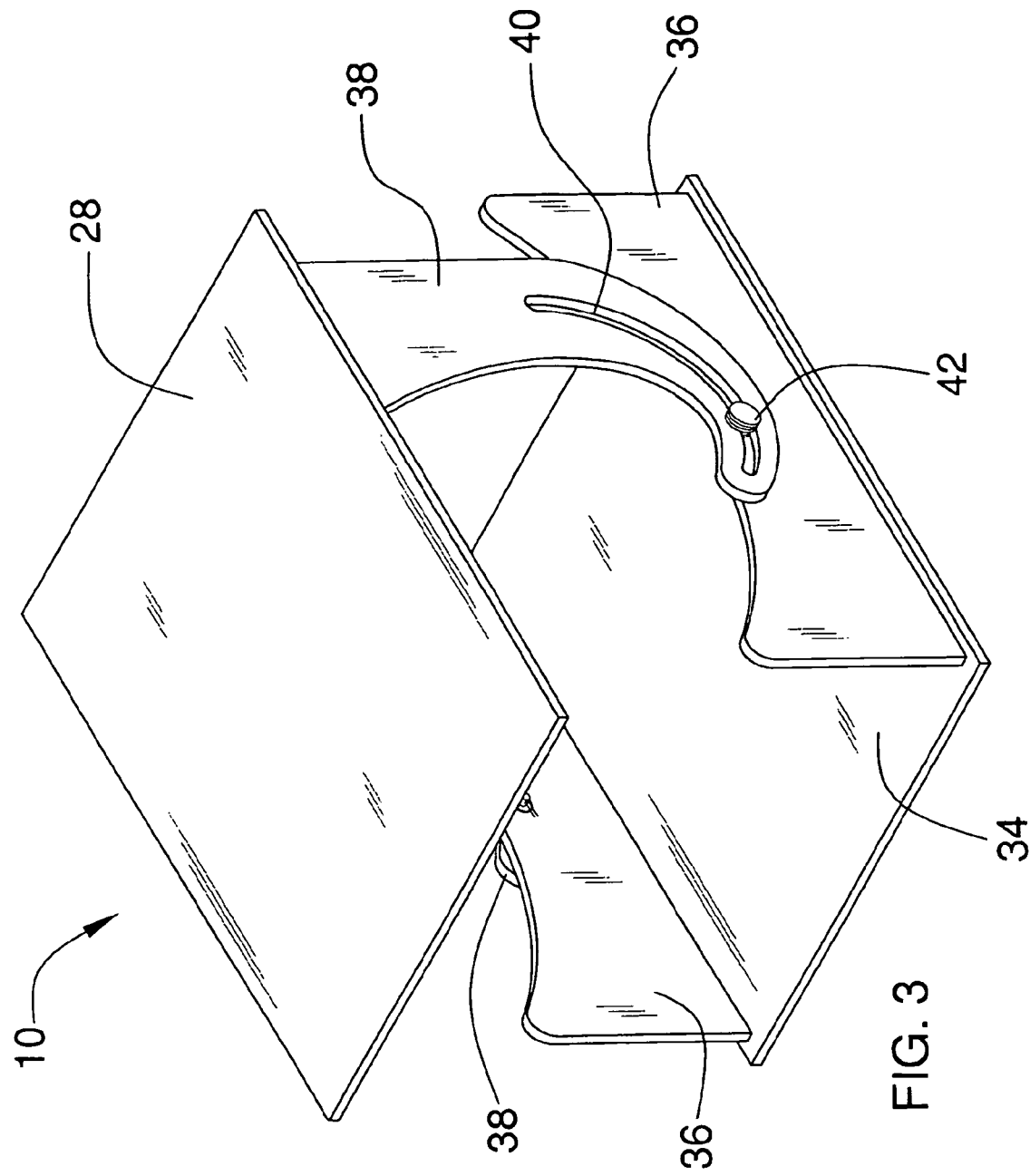
FIG. 3 is a perspective view of the tray, cam arms and lid.

As illustrated in FIG. 3, a pair of opposed cam arms 38 are mounted to the inner surface of the lid 28 at first ends. The second ends of the cam arms 38 are arcuately-shaped. An elongated slot 40 is integrally formed and extends longitudinally from relative mid-point of the cam arms 38 to the second end. A tray 34 having a top surface and a bottom surface is structured for holding a box retaining a quantity of litter material. A pair of opposed tray side walls 36 are mounted on the top surface of the tray 34 at a lower edge of each tray side wall 36, and extend vertically at a right angle from the tray 34. Each tray side wall 36 has an aperture near an upper edge.

Roller means 42 are connected to each tray side wall 36 near the upper edge, and are dimensioned to pass through and abut the slots 40 of the cam arms 38. The roller means 42 are moveable along the length of each slot 40.

Figure 4:
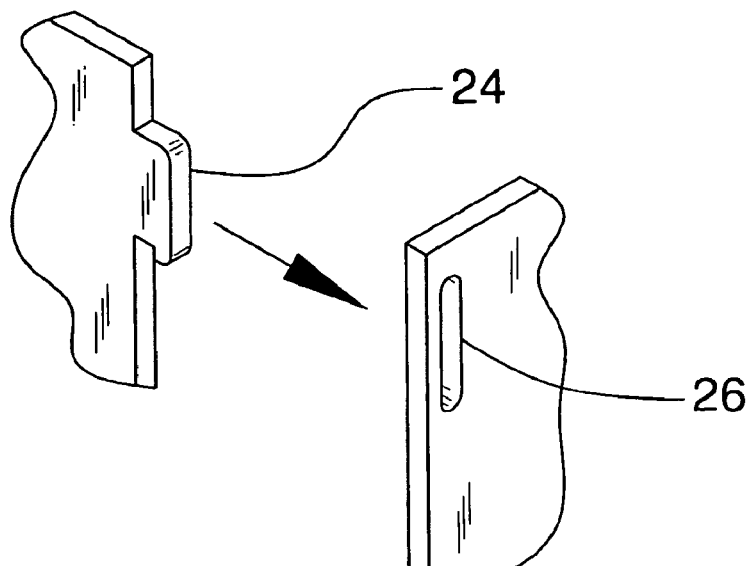
FIG. 4 is a fragmentary view of a prong and complimentary aperture.

The side walls 14, rear wall 16, front wall 18, and base 22 are secured to each other, preferably by complimentary prongs 24 and apertures 26. The tray side walls 36 may be secured to the tray 34, and the first end of the cam arms 38 to the lid 28, in a similar manner. The complimentary prongs 24 and apertures 26 are illustrated in FIG. 4, and in keeping with one aspect of the invention, facilitate the shipping and storage of the unassembled housing 12.

Figure 5:
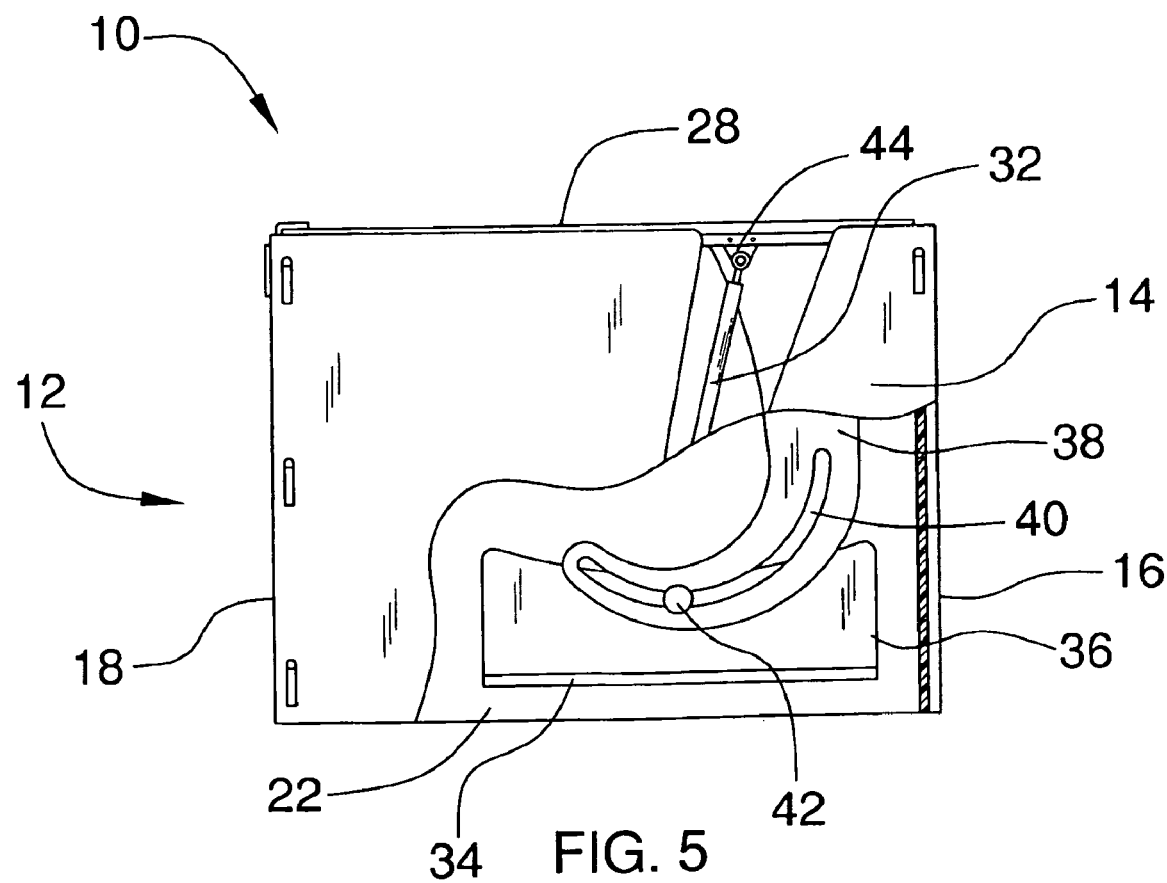
FIG. 5 is a cross-sectional side view of the invention with the lid closed.
Figure 6:
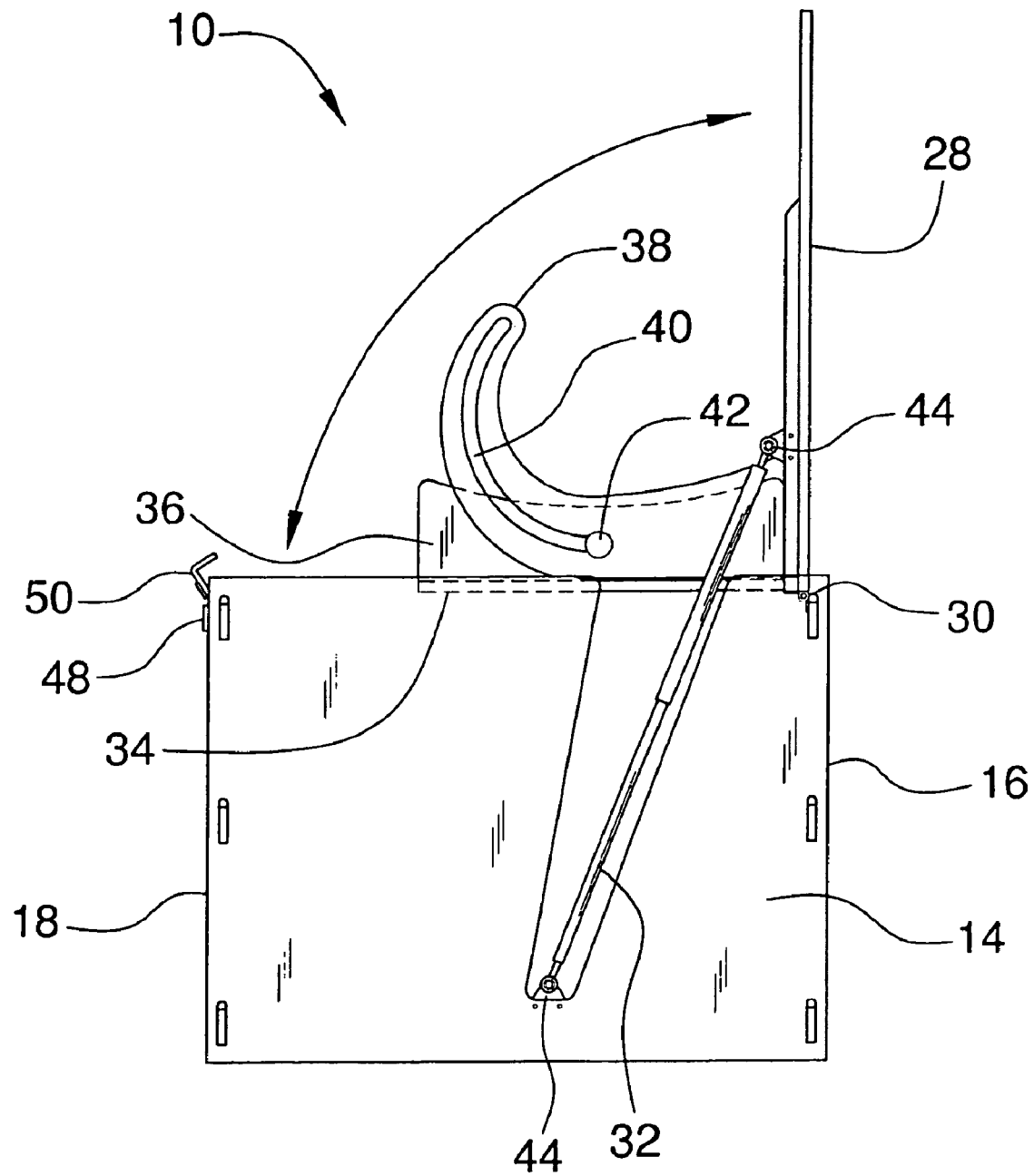
FIG. 6 is a side view of the invention in use in an open position.

With reference to FIGS. 5 and 6, a standard litter box is positioned on the tray 34. The tray 34 rests on the planer base 22 of the housing 12. When the litter box needs to be cleaned of waste material or discarded, the user of the device 10 turns the latch 48 and releases the holding member 50. The holding member 50 pivots away from the front wall 18. The lid 28 is now free to move, and the action of the gas springs 32 being released push the lid 28 upward. As the lid 28 is propelled in an upward manner the cam arms 38 pull the tray 34 upward with the roller means 42 moving through the length of the slot 40. Once above the roller means 42 move through the slot 40 to a terminal position the tray 34 is now elevated for the user. To lower the tray 34 the user pushes on the lid 28 in a downward manner against the gas springs 32 until the lid 28 is in its closed position. The holding member 50 recaptures the lid 28 and the latch 48 is rotated to secure the holding member 50. The tray 34 has now descended to the floor. If gas springs 32 are not mounted to the side walls 14 of the device 10, then the user can manually lift the lid 28 until the tray 34 is in the elevated position.

Figure 7:
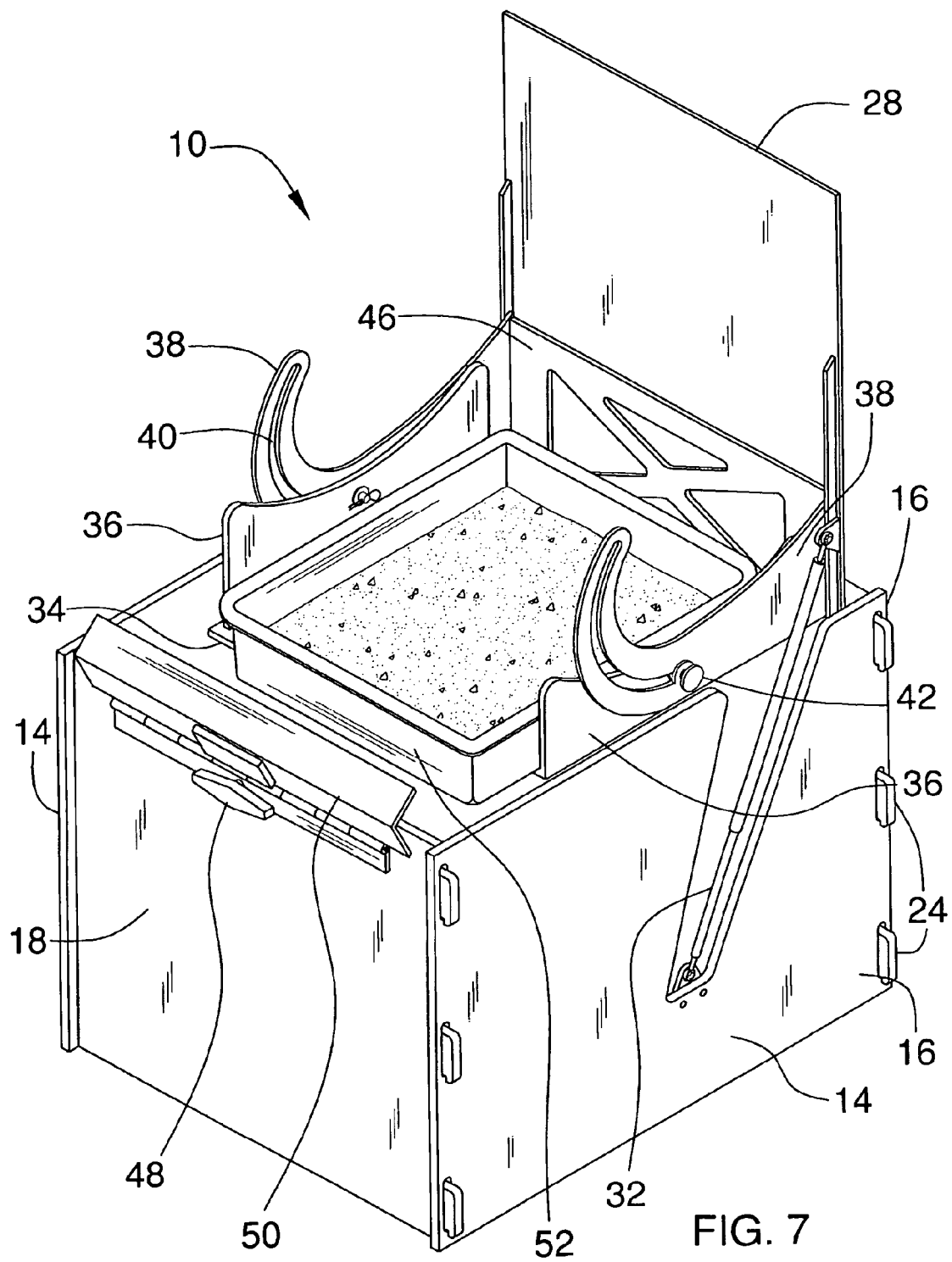
FIG. 7 is a perspective view of the invention with the lid open in use.

As further illustrated in FIG. 7, the tray 34, along with a litter box 52 that has been set on the tray 34, are in an elevated stable position. The user now has access to the litter box to clean or replace the litter box without stooping. An optional panel 46 is mounted between the cam arms 38 to provide a bracing mechanism so that the cam arms 38 at the first end do not tend inward during operation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description only and should not be regarded as limiting the scope and intent of the invention.

I claim:

1. A litter box lifting device, comprising in combination:
a housing having a pair of planer side walls, a planer rear wall, a planer front wall having an opening therein to permit ingress and egress of an animal, a planer base having first and second ends, and the side walls, front wall and rear wall extending substantially vertical at right angle from the base and each wall having an upper edge;
a lid having first end, second end, inner surface and outer surface, and being pivotally mounted to the housing, the lid being capable of being in an open and a closed position;
a pair of opposed gas springs having first and second ends, each being mounted at the first end to the inner surface of the lid and at the second end to one of the side walls;
a holding member mounted juxtaposed the upper edge of the front and a latch rotatably connected to the holding member;
a pair of opposed cam arms, each having a first end mounted to the inner surface of the lid, an arcuate-shaped second end, and an elongated slot integrally formed and extending longitudinally from relative mid-point of the cam arms to the second end;
a tray being structured for holding a box retaining a quantity of litter material having a top surface and a bottom surface;
a pair of opposed tray side walls having upper and lower edges, the lower edge of the tray side walls of the tray being mounted to the top surface of the tray and the tray side walls extending vertical at right angle from the tray;
roller means connected to the tray side walls and positioned within the slot of the cam arms; and
whereby pivoting the lid from closed position results in the roller means moving along the elongated slot of each cam arm resulting in the tray being in an elevated position.

2. The device of claim 1, further comprising a panel fitted between, and abutted against the first ends of the cam arms.

3. The device of claim 1, whereby the planer side, rear, and front walls are secured to each other, and to the planer base, by a plurality of prongs engaged to complimentary apertures.

4. A litter box lifting device, comprising in combination:
a housing having a pair of planer side walls, a planer rear wall, a planer front wall having an opening therein to permit ingress and egress of an animal, a planer base having first and second ends, and the side walls, front wall and rear wall extending substantially vertical at right angle from the base and each wall having an upper edge;
a lid having first end, second end, inner surface and outer surface, and being pivotally mounted to the housing, the lid being capable of being in an open and a closed position;
a pair of opposed cam arms, each having a first end mounted to the inner surface of the lid, an arcuate-shaped second end, and an elongated slot integrally formed and extending longitudinally from relative mid-point of the cam arms to the second end;
a tray being structured for holding a box retaining a quantity of litter material having a top surface and a bottom surface;
a pair of opposed tray side walls having upper and lower edges, the lower edge of the tray side walls of the tray being mounted to the top surface of the tray and the tray side walls extending vertical at right angle from the tray;
roller means connected to the tray side walls and positioned within the slot of the cam arms; and
whereby pivoting the lid from closed position results in the roller means moving along the elongated slot of each cam arm resulting in the tray being in an elevated position.

* * * * *